(12) United States Patent
Zhou et al.

(10) Patent No.: US 12,511,123 B2
(45) Date of Patent: Dec. 30, 2025

(54) FAST CARRY-CALCULATION ORIENTED REDUNDANCY-TOLERATED FIXED-POINT NUMBER CODING FOR MASSIVE PARALLEL ALU CIRCUITRY DESIGN IN GPU, TPU, NPU, AI INFER CHIP, CPU, AND OTHER COMPUTING DEVICES

(71) Applicant: Jun Zhou, Austin, TX (US)

(72) Inventors: Jun Zhou, Austin, TX (US); Xiaoyun Liu, College Station, TX (US)

(73) Assignee: Jun Zhou, Austin, TX (US)

( * ) Notice: Subject to any disclaimer, the term of this patent is extended or adjusted under 35 U.S.C. 154(b) by 236 days.

(21) Appl. No.: 18/495,049

(22) Filed: Oct. 26, 2023

(65) Prior Publication Data
US 2024/0143327 A1    May 2, 2024

Related U.S. Application Data

(60) Provisional application No. 63/420,352, filed on Oct. 28, 2022.

(51) Int. Cl.
*G06F 9/30*    (2018.01)
*G06F 7/57*    (2006.01)

(52) U.S. Cl.
CPC ............ *G06F 9/30094* (2013.01); *G06F 7/57* (2013.01); *G06F 9/3001* (2013.01)

(58) Field of Classification Search
CPC ....... G06F 9/30094; G06F 7/57; G06F 9/3001
See application file for complete search history.

(56) References Cited

U.S. PATENT DOCUMENTS

| 3,340,388 | A | | 9/1967 | Earle | |
|---|---|---|---|---|---|
| 4,159,529 | A | * | 6/1979 | Stakhov | G06F 7/60 708/670 |
| 4,956,802 | A | * | 9/1990 | Priem | G06F 7/508 708/711 |
| 5,276,635 | A | * | 1/1994 | Naini | G06F 7/508 708/713 |
| 5,951,631 | A | | 9/1999 | Hwang | |
| 7,240,085 | B2 | * | 7/2007 | Thayer | G06F 7/508 708/501 |
| 7,499,962 | B2 | * | 3/2009 | Tang | G06F 7/5443 708/501 |

(Continued)

FOREIGN PATENT DOCUMENTS

EP          0508411 A2   10/1992
WO    WO2009035561 A2    3/2009

*Primary Examiner* — Farley Abad
(74) *Attorney, Agent, or Firm* — Law Office of Vincent LoTempio, PLLC; Vincent G. LoTempio; Robert L. Cerasa

(57) ABSTRACT

A code method, a computer program product, and a system, for implementing a code method of Redundancy-Tolerated symmetric binary Coding (RTC) for massive parallel ALU circuitry design in GPU (Graphics Processing Unit), TPU (Tensor Processing Unit), NPU (Neural Processing Unit), Artificial Intelligence Inference Chip, CPU, and other computing chips and devices. The method can remove redundancy and reduce the dependency on carry bit computing. RTC code method can provide a redundancy-tolerated digital coding method for negative and positive integers, and can guarantee that number "0" have one and only one representation.

19 Claims, 18 Drawing Sheets

(56) References Cited

U.S. PATENT DOCUMENTS

| | | | | |
|---|---|---|---|---|
| 7,526,716 | B2* | 4/2009 | Kondou | H03M 13/1575 |
| | | | | 714/784 |
| 8,214,715 | B1* | 7/2012 | Haiut | H04L 1/0052 |
| | | | | 714/752 |
| 8,762,444 | B2* | 6/2014 | Gentle | G06F 7/00 |
| | | | | 708/525 |
| 10,255,205 | B1 | 4/2019 | Fick et al. | |
| 2007/0192398 | A1* | 8/2007 | Krithivasan | G06F 7/5338 |
| | | | | 708/620 |
| 2008/0104164 | A1* | 5/2008 | Kaul | G06F 7/5324 |
| | | | | 708/620 |
| 2020/0167127 | A1* | 5/2020 | Lokappa | G06F 7/506 |

\* cited by examiner

132. Allowing a none-zero integer to be coded by the proposed coding method by at least one representation and guaranteeing that the different representations of the same integer can be verified to be "equal" by a constant time [the runtime complexity of "=" testing is O(1) ]

134. Providing a parallel computing procedure for "add" operation of two integers presented as the proposed coding method and guaranteeing that the runtime to be constant independent of number of digital of two integers.

136. Providing a carry bit computing procedure/lookup-table for any digit for "add" operation of two integers presented as the proposed coding method and guaranteeing that the runtime to be constant independent of number of digital of two integers.

138. Allowing much simpler CMOS circuit implementation for ALU (arithmetic logic unit) to be designed for integers coded by proposed coding method.

140. Allowing much simpler CMOS circuit implementation for MAC (multiply-add operations) that is essential to GPU, TPU, and various AI chips

162. Allowing faster parallel computing for other math operations such as multiple, division, etc. Because their runtime complexity heavily depends on add operation.

164. Allowing faster parallel matrix computing whose runtime complexity heavily depends on add operation.

166. Allowing faster parallel computing for real numbers because real numbers are presented in digital computer through scientific notation of pair of integers.

168. Allowing faster parallel computing for complex integer numbers because complex numbers are presented in digital computer as a pair of integer for real and imaginary parts.

170. Allowing the separation of add operation to be separated into complete independent multiple add operations for each bit (for an integer of any length of bit) and thus allowing converting a runtime intense math calculation of real name of a much faster symbolic calculation.

172. Allowing add/minus/compare operations to be implemented for SRAM/DRAM word inside memory for CMOS technology

FIG. 3

- Redundancy-Tolerated symmetric binary coding for Fixed-Point numbers (RTcode2):
- RTcode2 Coding detail:
    - Each digit could be 1, 1⁻, or 0
    - Assume one RTcode2 coded num RTcode2_I has (n+1) digits denoted as : $i^n\ i^{n-1}\ i^{n-2}\ i^{n-3} \ldots i^0$ its math value ( denoted as math_val(RTcode2_I) ) is defined as following summary steps:

```
    int value=0;
    for (int x=n; x>=0; x--) {
        if ( iˣ == 1⁻ ) value += (-) 2ˣ ;
        if ( iˣ == 1 ) value += (+) 2ˣ ;
    }
    math_val(RTcode2_I) = value;
    ```

|  |  |  | $i^{x-1}$ | 1̄ | 0 | 1̄ | 0 | 1̄ | 1 | 0 | 1 | 1 |
|---|---|---|---|---|---|---|---|---|---|---|---|---|
|  |  |  | $j^{x-1}$ | 1̄ | 1̄ | 0 | 0 | 1 | 1̄ | 1 | 0 | 1 |
|  |  | math_val( $i^{x-1} + j^{x-1}$ ) |  | -2 | -1 | -1 | 0 | 0 | 0 | 1 | 1 | 2 |
|  | worst possible negative carry from (x-1) bit |  |  | -1 | -1 | -1 | 0 | 0 | 0 | - | - | - |
|  | worst possible positive carry from (x-1) bit |  |  | - | - | - | 0 | 0 | 0 | 1 | 1 | 1 |
| $i^x$ | $j^x$ | math_val( $i^x + j^x$ ) |  |  |  |  |  |  |  |  |  |  |
| 1̄ | 1̄ | -2 |  | -1 | -1 | -1 | -1 | -1 | -1 | -1 | -1 | -1 |
| 0 | 1̄ | -1 |  | -1 | -1 | -1 | 0 | 0 | 0 | 0 | 0 | 0 |
| 1̄ | 0 | -1 |  | -1 | -1 | -1 | 0 | 0 | 0 | 0 | 0 | 0 |
| 0 | 0 | 0 |  | 0 | 0 | 0 | 0 | 0 | 0 | 0 | 0 | 0 |
| 1̄ | 1 | 0 |  | 0 | 0 | 0 | 0 | 0 | 0 | 0 | 0 | 0 |
| 1 | 1̄ | 0 |  | 0 | 0 | 0 | 0 | 0 | 0 | 0 | 0 | 0 |
| 0 | 1 | 1 |  | 0 | 0 | 0 | 0 | 0 | 0 | 1 | 1 | 1 |
| 1 | 0 | 1 |  | 0 | 0 | 0 | 0 | 0 | 0 | 1 | 1 | 1 |
| 1 | 1 | 2 |  | 1 | 1 | 1 | 1 | 1 | 1 | 1 | 1 | 1 | means the carry bit has no dependency on (x-1) bit means the carry bit could be 0 (or -1)

means the carry bit could be 0 (or 1)

| | | | $i^{x-1}$ | $\bar{1}$ | 0 | $\bar{1}$ | 0 | $\bar{1}$ | 1 | 0 | 1 | 1 |
|---|---|---|---|---|---|---|---|---|---|---|---|---|
| | | | $j^{x-1}$ | $\bar{1}$ | $\bar{1}$ | 0 | 0 | 1 | $\bar{1}$ | 1 | 0 | 1 |
| | | math_val($i^{x-1} + j^{x-1}$) | | -2 | -1 | -1 | 0 | 0 | 0 | 1 | 1 | 2 |
| | | worst possible negative carry from (x-1) bit | | -1 | -1 | -1 | 0 | 0 | 0 | - | - | - |
| | | worst possible positive carry from (x-1) bit | | - | - | - | 0 | 0 | 0 | 1 | 1 | 1 |
| $i^x$ | $j^x$ | math_val($i^x + j^x$) | | | | | | | | | | |
| $\bar{1}$ | $\bar{1}$ | -2 | | 0 | 0 | 0 | 0 | 0 | 0 | 0 | 0 | 0 |
| 0 | $\bar{1}$ | -1 | | 1 | 1 | 1 | -1 | -1 | -1 | -1 | -1 | -1 |
| $\bar{1}$ | 0 | -1 | | 1 | 1 | 1 | -1 | -1 | -1 | -1 | -1 | -1 |
| 0 | 0 | 0 | | 0 | 0 | 0 | 0 | 0 | 0 | 0 | 0 | 0 |
| $\bar{1}$ | 1 | 0 | | 0 | 0 | 0 | 0 | 0 | 0 | 0 | 0 | 0 |
| 1 | $\bar{1}$ | 0 | | 0 | 0 | 0 | 0 | 0 | 0 | 0 | 0 | 0 |
| 0 | 1 | 1 | | 1 | 1 | 1 | 1 | 1 | 1 | -1 | -1 | -1 |
| 1 | 0 | 1 | | 1 | 1 | 1 | 1 | 1 | 1 | -1 | -1 | -1 |
| 1 | 1 | 2 | | 0 | 0 | 0 | 0 | 0 | 0 | 0 | 0 | 0 | means the local sum bit has no dependency on (x-1) bit means the local sum bit could be -1 (or 1) depending on the carry bit choice means the local sum bit could be 1 (or -1) depending on the carry bit choice

FIG. 5B

- Redundancy-Tolerated non-symmetric non-binary n-way coding for Fixed-Point numbers (for the purpose of simplicity, n is assumed to be 3, but can be any positive number greater than 2) (RTcode3):
- RTcode3 Coding detail:
  - Each digit could be 2, 1, 1⁻, or 0
  - Assume one RTcode3 coded num RTcode3_I has (n+1) digits denoted as : $i^n$ $i^{n-1}$ $i^{n-2}$ $i^{n-3}$ ... $i^0$
    its math value ( denoted as math_val(RTcode3_I) ) is defined as following summary steps:

```
    int value=0;
    for (int x=n; x>=0; x--) {
        if ( iˣ == 1⁻ ) value += (-) 3ˣ ;
        if ( iˣ == 1 ) value += (+) 3ˣ ;
        if ( iˣ == 2 ) value += (+) 2*3ˣ ;
        }
    math_val(RTcode3_I) = value;
    ```

FIG. 6

| $i^{x-1}$ | 1̄ | 0 | 1̄ | 0 | 1̄ | 1 | 0 | 1 | 2 | 1̄ | 1 | 2 | 0 | 2 | 1 | 2 |
|---|---|---|---|---|---|---|---|---|---|---|---|---|---|---|---|---|
| $j^{x-1}$ | 1̄ | 1̄ | 0 | 0 | 1 | 1̄ | 1 | 0 | 1̄ | 2 | 1 | 0 | 2 | 1 | 2 | 2 |
| math_val($i^{x-1} + j^{x-1}$) | -2 | -1 | -1 | 0 | 0 | 0 | 1 | 1 | 1 | 1 | 2 | 2 | 2 | 3 | 3 | 4 |
| worst possible negative carry from (x-1) b | -1 | -1 | -1 | 0 | 0 | 0 | 0 | 0 | 0 | 0 | - | - | - | - | - | - |
| worst possible positive carry from (x-1) b | - | - | - | 0 | 0 | 0 | 0 | 0 | 0 | 0 | 1 | 1 | 1 | 1 | 1 | 1 |

| $i^x$ | $j^x$ | math_val($i^x + j^x$) | | | | | | | | | | | | | | | |
|---|---|---|---|---|---|---|---|---|---|---|---|---|---|---|---|---|---|
| 1̄ | 1̄ | -2 | -1 | -1 | -1 | -1 | -1 | -1 | -1 | -1 | -1 | -1 | -1 | -1 | -1 | -1 | -1 | -1 |
| 0 | 1̄ | -1 | -1 | -1 | -1 | 0 | 0 | 0 | 0 | 0 | 0 | 0 | 0 | 0 | 0 | 0 | 0 | 0 |
| 1̄ | 0 | -1 | -1 | -1 | -1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 1̄ | 1 | 0 | 0 | 0 | 0 | 0 | 0 | 0 | 0 | 0 | 0 | 0 | 0 | 0 | 0 | 0 | 0 | 0 |
| 1 | 1̄ | 0 | 0 | 0 | 0 | 0 | 0 | 0 | 0 | 0 | 0 | 0 | 0 | 0 | 0 | 0 | 0 | 0 |
| 0 | 1 | 1 | 0 | 0 | 0 | 0 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 | 0 | 0 | 0 |
| 2 | 1̄ | 1 | 0 | 0 | 0 | 0 | 0 | 0 | 0 | 0 | 0 | 0 | 0 | 0 | 0 | 0 | 0 | 0 |
| 1̄ | 2 | 1 | 0 | 0 | 0 | 0 | 0 | 0 | 0 | 0 | 0 | 0 | 0 | 0 | 0 | 0 | 0 | 0 |
| 1 | 1 | 2 | 0 | 0 | 0 | 0 | 0 | 0 | 0 | 0 | 0 | 0 | 1 | 1 | 1 | 1 | 1 | 1 |
| 2 | 0 | 2 | 0 | 0 | 0 | 0 | 0 | 0 | 0 | 0 | 0 | 0 | 1 | 1 | 1 | 1 | 1 | 1 |
| 0 | 2 | 2 | 0 | 0 | 0 | 0 | 0 | 0 | 0 | 0 | 0 | 0 | 1 | 1 | 1 | 1 | 1 | 1 |
| 2 | 1 | 3 | 1 | 1 | 1 | 1 | 1 | 1 | 1 | 1 | 1 | 1 | 1 | 1 | 1 | 1 | 1 | 1 |
| 1 | 2 | 3 | 1 | 1 | 1 | 1 | 1 | 1 | 1 | 1 | 1 | 1 | 1 | 1 | 1 | 1 | 1 | 1 |
| 2 | 2 | 4 | 1 | 1 | 1 | 1 | 1 | 1 | 1 | 1 | 1 | 1 | 1 | 1 | 1 | 1 | 1 | 1 | means the carry bit has no dependency on (x-1) bit means the carry bit could be 0 (or -1)

means the carry bit could be 0 (or 1)

| $i^x$ | $j^x$ | math_val($i^x$ + $j^x$) | | | $i^{x-1}$ | 1̄ | 0 | 1̄ | 0 | 1̄ | 1 | 0 | 1 | 2 | 1̄ | 1 | 2 | 0 | 2 | 1 | 2 |
|---|---|---|---|---|---|---|---|---|---|---|---|---|---|---|---|---|---|---|---|---|---|
| | | | | | $j^{x-1}$ | 1̄ | 1̄ | 0 | 0 | 1 | 1̄ | 1 | 0 | 1̄ | 2 | 1 | 0 | 2 | 1 | 2 | 2 |
| | | | | math_val($i^{x-1}$ + $j^{x-1}$) | | -2 | -1 | -1 | 0 | 0 | 0 | 1 | 1 | 1 | 1 | 2 | 2 | 2 | 3 | 3 | 4 |
| | | worst possible negative carry from (x-1) bit | | | | -1 | -1 | -1 | 0 | 0 | 0 | 0 | 0 | 0 | 0 | - | - | - | - | - | - |
| | | worst possible positive carry from (x-1) bit | | | | - | - | - | 0 | 0 | 0 | 0 | 0 | 0 | 0 | 1 | 1 | 1 | 1 | 1 | 1 |
| 1̄ | 1̄ | -2 | | | | 1 | 1 | 1 | 1 | 1 | 1 | 1 | 1 | 1 | 1 | 1 | 1 | 1 | 1 | 1 | 1 |
| 0 | 1̄ | -1 | | | | 2 | 2 | 2 | -1 | -1 | -1 | -1 | -1 | -1 | -1 | -1 | -1 | -1 | -1 | -1 | -1 |
| 1̄ | 0 | -1 | | | | 2 | 2 | 2 | -1 | -1 | -1 | -1 | -1 | -1 | -1 | -1 | -1 | -1 | -1 | -1 | -1 |
| 0 | 0 | 0 | | | | 0 | 0 | 0 | 0 | 0 | 0 | 0 | 0 | 0 | 0 | 0 | 0 | 0 | 0 | 0 | 0 |
| 1̄ | 1 | 0 | | | | 0 | 0 | 0 | 0 | 0 | 0 | 0 | 0 | 0 | 0 | 0 | 0 | 0 | 0 | 0 | 0 |
| 1 | 1̄ | 0 | | | | 0 | 0 | 0 | 0 | 0 | 0 | 0 | 0 | 0 | 0 | 0 | 0 | 0 | 0 | 0 | 0 |
| 0 | 1 | 1 | | | | 1 | 1 | 1 | 1 | 1 | 1 | 1 | 1 | 1 | 1 | 1 | 1 | 1 | 1 | 1 | 1 |
| 1 | 0 | 1 | | | | 1 | 1 | 1 | 1 | 1 | 1 | 1 | 1 | 1 | 1 | 1 | 1 | 1 | 1 | 1 | 1 |
| 2 | 1̄ | 1 | | | | 1 | 1 | 1 | 1 | 1 | 1 | 1 | 1 | 1 | 1 | 1 | 1 | 1 | 1 | 1 | 1 |
| 1̄ | 2 | 1 | | | | 1 | 1 | 1 | 1 | 1 | 1 | 1 | 1 | 1 | 1 | 1 | 1 | 1 | 1 | 1 | 1 |
| 1 | 1 | 2 | | | | 2 | 2 | 2 | 2 | 2 | 2 | 2 | 2 | 2 | 2 | -1 | -1 | -1 | -1 | -1 | -1 |
| 2 | 0 | 2 | | | | 2 | 2 | 2 | 2 | 2 | 2 | 2 | 2 | 2 | 2 | -1 | -1 | -1 | -1 | -1 | -1 |
| 0 | 2 | 2 | | | | 2 | 2 | 2 | 2 | 2 | 2 | 2 | 2 | 2 | 2 | -1 | -1 | -1 | -1 | -1 | -1 |
| 2 | 1 | 3 | | | | 0 | 0 | 0 | 0 | 0 | 0 | 0 | 0 | 0 | 0 | 0 | 0 | 0 | 0 | 0 | 0 |
| 1 | 2 | 3 | | | | 0 | 0 | 0 | 0 | 0 | 0 | 0 | 0 | 0 | 0 | 0 | 0 | 0 | 0 | 0 | 0 |
| 2 | 2 | 4 | | | | 1 | 1 | 1 | 1 | 1 | 1 | 1 | 1 | 1 | 1 | 1 | 1 | 1 | 1 | 1 | 1 | means the local sum bit has no dependency on (x-1) bit means the local sum bit could be -1 (or 2) depending on the carry bit choice means the local sum bit could be 2 (or -1) depending on the carry bit choice

FIG. 7B

FAST CARRY-CALCULATION ORIENTED REDUNDANCY-TOLERATED FIXED-POINT NUMBER CODING FOR MASSIVE PARALLEL ALU CIRCUITRY DESIGN IN GPU, TPU, NPU, AI INFER CHIP, CPU, AND OTHER COMPUTING DEVICES

CROSS REFERENCE OF RELATED APPLICATIONS

This application claims the benefits of U.S. provisional application No. 63/420,352 filed Oct. 28, 2022 and entitled "FAST CARRY-CALCULATION ORIENTED REDUNDANCY-TOLERATED FIXED-POINT NUMBER CODING FOR MASSIVE PARALLEL ALU CIRCUITRY DESIGN IN GPU, TPU, NPU, AI INFER CHIP, CPU, AND OTHER COMPUTING DEVICES", which provisional application is incorporated by reference herein in its entirety.

BACKGROUND

The present disclosure relates generally to the field of Electric Digital Data Processing technology, and more particularly to remove/simplify Carry Calculation, and thus significantly reduce the complexity of high performance on arithmetic-logic unit (ALU) Circuitry Design. Consequently, the parallelization degree and the number of computation units (e.g. multiplier—accumulator (MAC) unit) in Graphics processing unit (GPU), central processing unit (CPU), Tensor Processing Unit (TPU), Neural Processing Unit (NPU), Field Programmable Gate Arrays (FPGA), and application-specific integrated circuits (ASICs) can be dramatically increased.

The field of carry-calculation technology is one of the important computing features in any computing related operations.

It is hard to use modern parallel processing chips to support carry-calculation due to known dependence on carry bit computing.

SUMMARY

Embodiments of the present invention disclose a code method, a computer program product, and a system, for implementing a code method of Redundancy-Tolerated symmetric binary Coding (RTC), e.g. fast carry-calculation oriented redundancy-tolerated Fixed-Point number coding, for ALU circuitry design in GPU, TPU, NPU, Artificial Intelligence Inference Chip, CPU, FPGA, ASICs and other computing chips and devices.

According to an embodiment, a RTC code method provides a redundancy-tolerated digital coding method for negative and positive integers. The RTC code method guarantees that number "0" have one and only one representation. The RTC code method allows a none-zero integer to be coded by the proposed coding method by at least one representation and guaranteeing that the different representations of the same integer can be verified to be "equal" by a constant time [the runtime complexity of "=" testing is O(1)]. The RTC code method further provides a parallel computing procedure for "add" operation of two integers presented as the proposed coding method and guaranteeing that the runtime to be constant independent of number of digital of two integers. The RTC code method further provides a carry bit computing procedure/lookup-table for any digit for "add" operation of two integers presented as the proposed coding method and guaranteeing that the runtime to be constant independent of number of digital of two integers. The RTC code method allows much simpler CMOS (complementary metal-oxide semiconductor) circuit implementation for Arithmetic Logic Unit (ALU) to be designed for integers coded by proposed coding method. The RTC code method further allows much simpler CMOS circuit implementation for MAC (multiply-add operations) that is essential to GPU, TPU, NPU, and various AI chips for training or applying the ML models based on neural network. The RTC code further allows faster parallel computing for other math operations such as multiple, division, etc. because their runtime complexity heavily depends on add operation. The RTC code further allows faster parallel matrix computing whose runtime complexity heavily depends on add operation. The RTC code further allows faster parallel computing for real numbers because real numbers are presented in digital computer through scientific notation of pair of integers. The RTC code further allows faster parallel computing for complex integer numbers because complex numbers are presented in digital computer as a pair of integers for real and imaginary parts. The RTC code further allows the separation of add operation to be separated into complete independent multiple add operations for each bit (for an integer of any length of bit) and thus allowing converting a runtime intense math calculation of real name of a much faster symbolic calculation. The RTC code further allows add, minus, or compare operations to be implemented for SRAM (Static Random-Access Memory) and/or DRAM (Dynamic Random-Access Memory) word inside memory for CMOS technology.

A computing instruction set architecture (such as x86, ARM, RISC-V any kind of extended versions, or new instruction sets), according to an embodiment of the invention, includes a non-transitory tangible storage device having program code embodied therewith. The program code is executable by a processor of a computer to perform the RTC code method.

A computer program product, according to an embodiment of the invention, includes a non-transitory tangible storage device having program code embodied therewith. The program code is executable by a processor of a computer to perform the RTC code method.

A computer system, according to an embodiment of the invention, includes one or more components for using and executing the code method of Redundancy-Tolerated symmetric binary Coding (RTC) computer devices each having one or more processors and one or more tangible storage devices; and a program embodied on at least one of the one or more storage devices, the program having a plurality of program instructions for execution by the one or more processors. The program instructions implement the RTC code method. The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit disclosure.

FIG. 2 illustrates operations of Redundancy-Tolerated symmetric binary Coding (RTC), in accordance with embodiments of the present disclosure.

FIG. 3 further illustrates more operations of Redundancy-Tolerated symmetric binary Coding (RTC), in accordance with embodiments of the present disclosure.

FIG. 4 illustrates a pseudocode of RRcode2 steps in Redundancy-Tolerated symmetric binary Coding (RTC) system, in accordance with embodiments of the present disclosure.

FIG. 5A illustrates details RRcode2 operations in Redundancy-Tolerated symmetric binary Coding (RTC), in accordance with embodiments of the present disclosure.

FIG. 5B further illustrates details RRcode2 operations in Redundancy-Tolerated symmetric binary Coding (RTC), in accordance with embodiments of the present disclosure.

FIG. 6 illustrates a pseudocode of RRcode3 steps in Redundancy-Tolerated symmetric binary Coding (RTC) system, in accordance with embodiments of the present disclosure.

FIG. 7A illustrates details RRcode3 operations in Redundancy-Tolerated symmetric binary Coding (RTC), in accordance with embodiments of the present disclosure.

FIG. 7B further illustrates details of RRcode3 operations in Redundancy-Tolerated symmetric binary Coding (RTC), in accordance with embodiments of the present disclosure.

Figure 1:
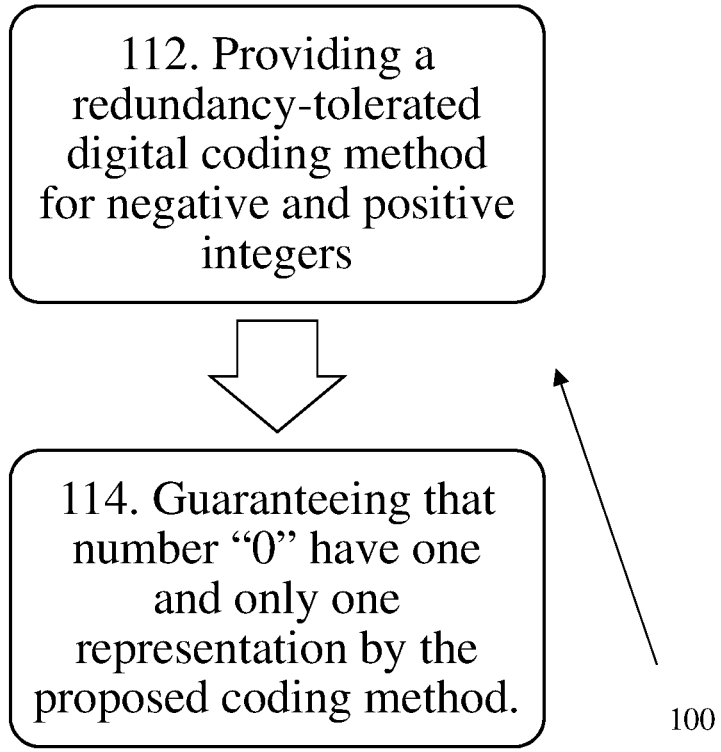
FIG. 1 illustrates an exemplary embodiment of Redundancy-Tolerated symmetric binary Coding (RTC), in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Referring now to FIG. 1, a block diagram of Redundancy-Tolerated symmetric binary Coding (RTC) system 100, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, Redundancy-Tolerated symmetric binary Coding (RTC) system 100 can include two major steps: The step 112 Providing a redundancy-tolerated digital coding method for negative and positive integers. The step 114. Guaranteeing that number "0" have one and only one representation by the proposed coding method.

Referring now to FIG. 2, detailed operations of Redundancy-Tolerated symmetric binary Coding (RTC) illustrating an example method 200 for implement Carry bit computing, in accordance with embodiments of the present disclosure. The method 200 operations include: Step 132. Allowing a none-zero integer to be coded by the proposed coding method by at least one representation and guaranteeing that the different representations of the same integer can be verified to be "equal" by a constant time [the runtime complexity of "=" testing is O(1)]; Step 134. Providing a parallel computing procedure for "add" operation of two integers presented as the proposed coding method and guaranteeing that the runtime to be constant independent of number of digital of two integers; Step 136. Providing a carry bit computing procedure/lookup-table for any digit for "add" operation of two integers presented as the proposed coding method and guaranteeing that the runtime to be constant independent of number of digital of two integers; Step 138. Allowing much simpler CMOS circuit implementation for ALU (arithmetic logic unit) to be designed for integers coded by proposed coding method; Step 140. Allowing much simpler CMOS circuit implementation for MAC (multiply-add operations) that is essential to GPU, TPU, NPU, and various AI chips.

Referring now to FIG. 3, further detailed operations of Redundancy-Tolerated symmetric binary Coding (RTC) illustrating an example method 300 for implement Carry bit computing, in accordance with embodiments of the present disclosure. The method 300 operations include: Step 162. Allowing faster parallel computing for other math operations such as multiple, division, etc. Because their runtime complexity heavily depends on add operation; Step 164. Allowing faster parallel matrix computing whose runtime complexity heavily depends on add operation; Step 166. Allowing faster parallel computing for real numbers because real numbers are presented in digital computer through scientific notation of pair of integers; Step 168. Allowing faster parallel computing for complex integer numbers because complex numbers are presented in digital computer as a pair of integer for real and imaginary parts; Step 170. Allowing the separation of add operation to be separated into complete independent multiple add operations for each bit (for an integer of any length of bit) and thus allowing converting a runtime intense math calculation of real name of a much faster symbolic calculation; Step 172. Allowing add/minus/compare operations to be implemented for SRAM/DRAM word inside memory for CMOS technology.

Referring now to FIG. 4, a pseudocode 400 of RTcode2 illustrating an example method of Redundancy-Tolerated symmetric binary Coding (RTC) illustrating an example method.

Referring now to FIG. 5A, a Carry Bit operation table 500 of RTcode2 illustrating an example method of Redundancy-Tolerated symmetric binary Coding (RTC) illustrating an example method:

RTcode2 Adder Carry bit Lookup Table:
  Each digit could be 1, $1^-$, or 0
    Assume two RTcode2 coded num RTcode2_I, RTcode2_J, and they have (n+1) digits denoted as:
  RTcode2_I:=$i^n i^{n-1} i^{n-2} i^{n-3} \ldots i^0$
  RTcode2_J:=$j^n j^{n-1} j^{n-2} j^{n-3} \ldots j^0$
  For any bit index x: x>=0 and x<=n, the carry of bit index x can be obtained by using lookup table 500 as shown in FIG. 5A. Due to embedded coding redundancy, the above carry lookup is not unique, and all its variation is covered by this patent.

Referring now to FIG. 5B, a secondary Carry Bit operation table 550 of RTcode2 illustrating an example method of Redundancy-Tolerated symmetric binary Coding (RTC) illustrating an example method:

RTcode2 Adder Carry bit Lookup Table:
  Each digit could be 1, 1−, or 0
    Assume two RTcode2 coded num RTcode2_I, RTcode2_J, and they have (n+1) digits denoted as:
  RTcode2_I:=$i^n i^{n-1} i^{n-2} i^{n-3} \ldots i^0$
  RTcode2_J:=$j^n j^{n-1} j^{n-2} j^{n-3} \ldots j^0$ For any bit index x: x>=0 and x<=n, the carry of bit index x can be obtained by using lookup table 550 as shown in FIG. 5B. Due to embedded coding redundancy, the carry lookup in FIG. 5B, table 550, is not unique, and thus, its corresponding local sum lookup table is also not unique. All its variation is covered by this patent. Final sum=local sum+previous bit carry, and it can be proved to be one of: 1, 1−, or 0.

Referring now to FIG. 6, a pseudocode 600 of RTcode3 illustrating an example method of Redundancy-Tolerated symmetric binary Coding (RTC) illustrating an example method.

Referring now to FIG. 7A, a Carry Bit operation table 700 of RTcode3 illustrating an example method of Redundancy-Tolerated symmetric binary Coding (RTC) illustrating an example method:

RTcode3 Adder Carry bit Lookup Table:
  Each digit could be 2, 1, 1−, or 0
    Assume two RTcode2 coded num RTcode3_I, RTcode3_J, and they have (n+1) digits denoted as:
  RTcode3_I:=$i^n i^{n-1} i^{n-2} i^{n-3} \ldots i^0$
  RTcode3_J:=$j^n j^{n-1} j^{n-2} j^{n-3} \ldots j^0$ For any bit index x: x>=0 and x<=n, the carry of bit index x can be obtained by using lookup table 700 as shown in FIG. 7A. Due to embedded coding redundancy, the above carry lookup is not unique, and all its variation is covered by this patent.

Referring now to FIG. 7B, a secondary Carry Bit operation table 750 of RTcode3 illustrating an example method of Redundancy-Tolerated symmetric binary Coding (RTC) illustrating an example method. As discussed in more detail herein, it is contemplated that some or all of the operations of the methods in all figures may be performed in alternative orders or may not be performed at all; furthermore, multiple operations may occur at the same time or as an internal part of a larger process.

For any bit index x: x>=0 and x<=n, the carry of bit index x can be obtained by using lookup table 750 as shown in FIG. 7B. Due to embedded coding redundancy, the carry lookup, in FIG. 7B, table 750, is also not unique, and thus, its corresponding local sum lookup table is also not unique. All its variation is covered by this patent. Final sum=local sum+previous bit carry, and it can be proved to be one of: 2, 1, 1−, or 0.

Figure 7C:
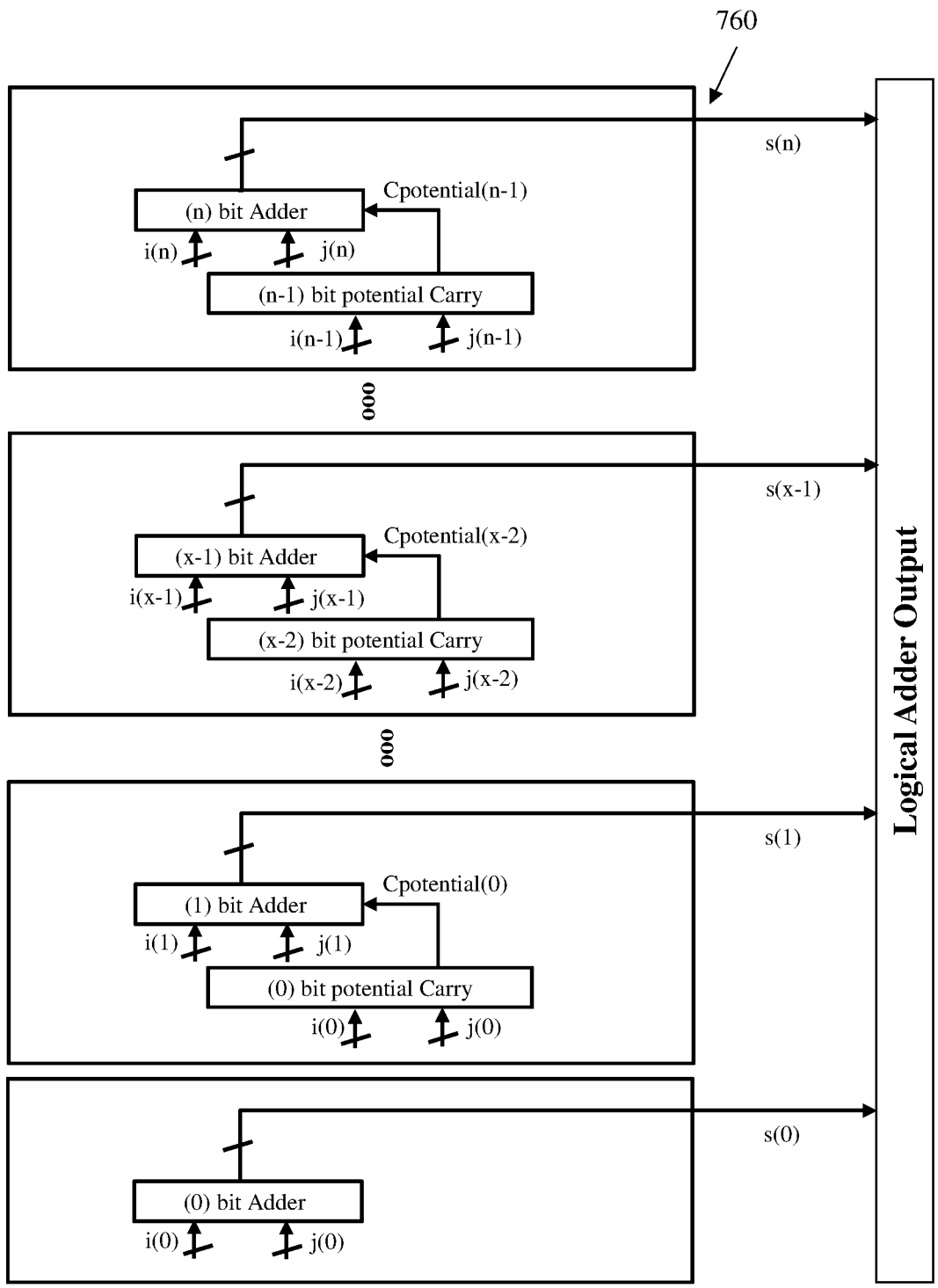
FIGS. 7C, 7D, 7E, 7F, 7G and 7H further illustrates examples of CMOS logical adder circuitry schematic with constant timing cost in adding operation, in accordance with embodiments of the present disclosure.

Referring now to FIG. 7C (CMOS logical adder 760), It is the CMOS logical adder circuitry with constant timing cost, for RTcoded numbers. Assume that there are two RTcoded numbers I and −J, defined as of any base (including 2, 3, 7, etc.)
  RTcode2_I:=$i^n i^{n-1} i^{n-2} i^{n-3} \ldots i^0$
  RTcode2_J:=$j^n j^{n-1} j^{n-2} j^{n-3} \ldots j^0$ "Cpotential$^{(x-1)}$" in FIG. 7C refers to the "worst possible negative/positive carry from (x−1) bit" in the lookup table in FIGS. 5A, 5B, 7A and 7B. Its value could be 1, 1−, or 0. Because Cpotential$^{(x-1)}$ is independent of the base of RTcode encoding, we can assume it is a single logic bit for simplicity.

RTcode: $S = s^{(n)} s^{(n-1)} s^{(n-2)} s^{(n-3)} \ldots s^{(0)}$ is defined as the sum(I, −J).$s^{(n)} s^{(n-1)} s^{(n-2)} s^{(n-3)} \ldots s^{(0)}$ can be calculated and implemented independently.

Per circuit implementation, for any bit (x): $i^{(x)}$, $j^{(x)}$, $s^{(x)}$ are bus signals, and Cpotential$^{(x)}$ is a single bit signal.

Figure 7D:
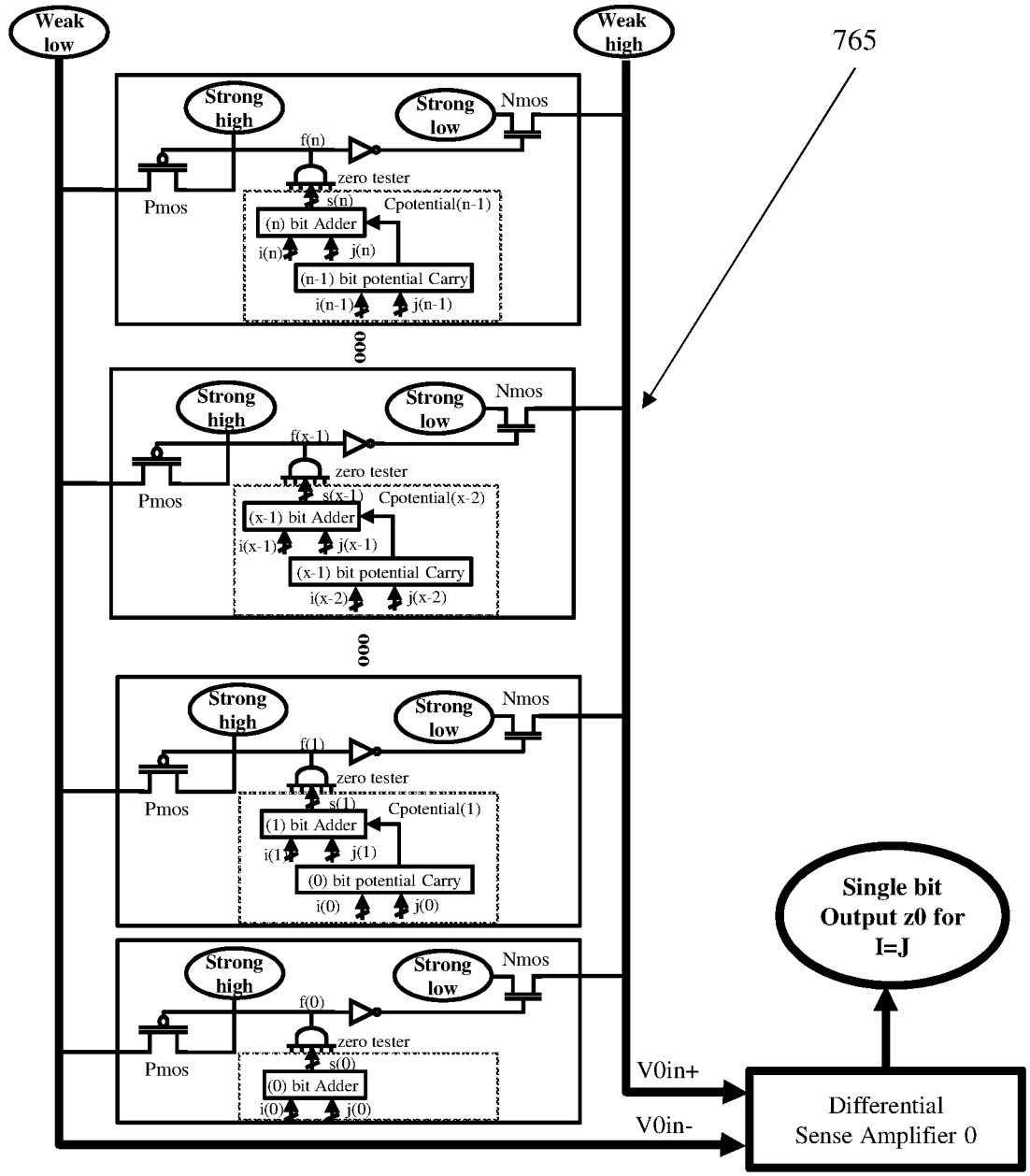

Referring now to FIG. 7D (765), it is the CMOS equality checking circuitry sharing the same circuit block (dotted line boxes) with the adder circuitry described in FIG. 7C. Assume there are two RTcoded numbers I and −J, defined as of any base (including 2, 3, 7, etc.):
  RTcode: I=$i^n i^{n-1} i^{n-2} i^{n-3} \ldots i^0$
  RTcode: −J=$j^n j^{n-1} j^{n-2} j^{n-3} \ldots j^0$ "Cpotential$^{(x-1)}$" in this diagram refers to the "worst possible negative carry from (x−1) bit" in the lookup table in FIGS. 5A, 5B, 7A and 7B. its value could be 1, 1−, or 0. Because Cpotential$^{(x-1)}$ is independent of the base of RTcode encoding, we can assume it is a single logic bit for simplicity.

RTcode: $S = s^{(n)} s^{(n-1)} s^{(n-2)} s^{(n-3)} \ldots s^{(0)}$ is defined as the sum(I, −J)

$F = f^{(n)} f^{(n-1)} f^{(n-2)} f^{(n-3)} \ldots f^{(0)}$ is a series of binary flag:
  $f^{(x)} = 1$(high), if and only if $s^{(x)} =$ zero
  z0 is 1(high) if I=J; and 0(low) if I !=J
  z1 is introduced to notate whether I=J with the least significant bit ignored ($i^{(0)}$ and $j^{(0)}$)
  z2 is introduced to notate whether I=J with the 2 least significant bits ignored ($i^{(1)} i^{(0)}$ and $j^{(1)} j^{(0)}$)
  Similarly, z3, z4, . . . z(n−1) can be defined.

Per circuit implementation, for any bit (x): $i^{(x)}$, $j^{(x)}$, $s^{(x)}$ are bus signal, and Cpotential$^{(x)}$, $f^{(x)}$, V0in+, V0in− are single bit signal.

In more details:
1) By reusing/sharing the base adder circuitry (shown by the dotted line box) as described in FIG. 7C, logical identity comparator can be implemented by adding a few MOSFET devices and a sense amplifier (commonly used in SRAM/DRAM circuitry).
2) "zero tester" logic blocks will test whether each individual $s^{(x)}$, $s^{(x-1)}$, $s^{(1)}$ and $s^{(0)}$ is zero or not. The outputs are binary flags $f^{(x)}$, $f^{(x-1)}$, $f^{(1)}$ and $f^{(0)}$ respectively.
3) If all flags $f^{(n)} f^{(n-1)} f^{(n-2)} f^{(n-3)} \ldots f^{(0)}$ are high, it means I=J, in such case, all Pmos/Nmos will be shut off. The inputs of "Differential Sense Amplifier 0" logic "V0in+" and "V0in−" will be "Weak High" and "Weak High" respectively, its output "z0" will 1(high).
4) If any of flag $f^{(n)} f^{(n-1)} f^{(n-2)} f^{(n-3)} \ldots f^{(0)}$ is low, it means I!=J, in such case, at least one pair of Pmos/Nmos of one block will be in "On" state, "V0in+" will be pulled down by "Strong low" and "V0in−" will be pulled up by "Strong high"; and then, The output "z0" of "Differential Sense Amplifier 0" logic will be 0(low)
5) This unique mixed signal design will assure almost constant timing cost due to much smaller bit numbers.

Figure 7E:
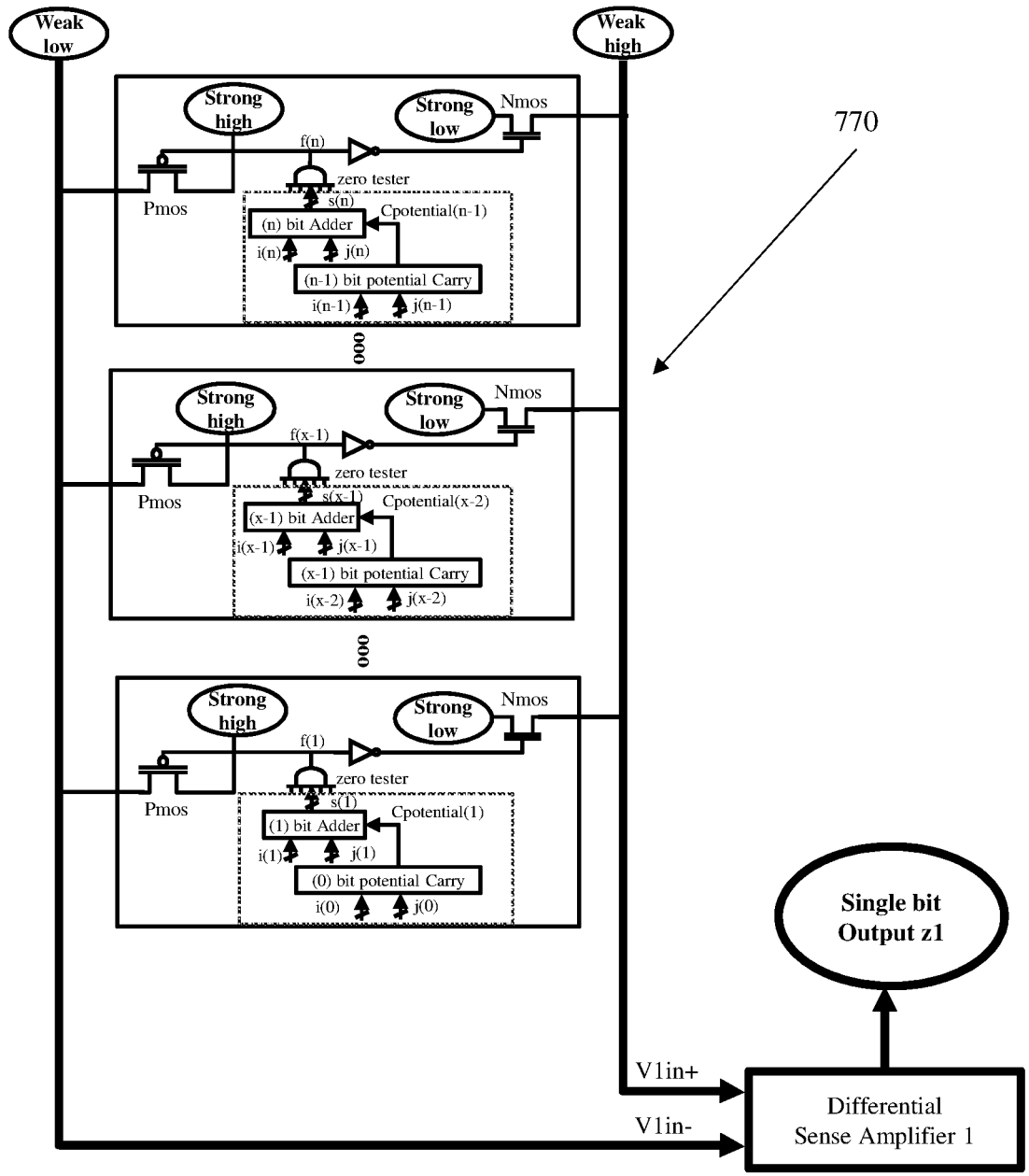

Referring now to FIG. 7E (770), by reusing/sharing the base adder circuitry+"zero tester"s+"inverter"s (shown by dotted line box in both FIGS. 7D and 7E), Circuitry z(1) can be implemented with a few extra Pmos/Nmos pairs and "Differential Sense Amplifiers" efficiently.

Figure 7F:
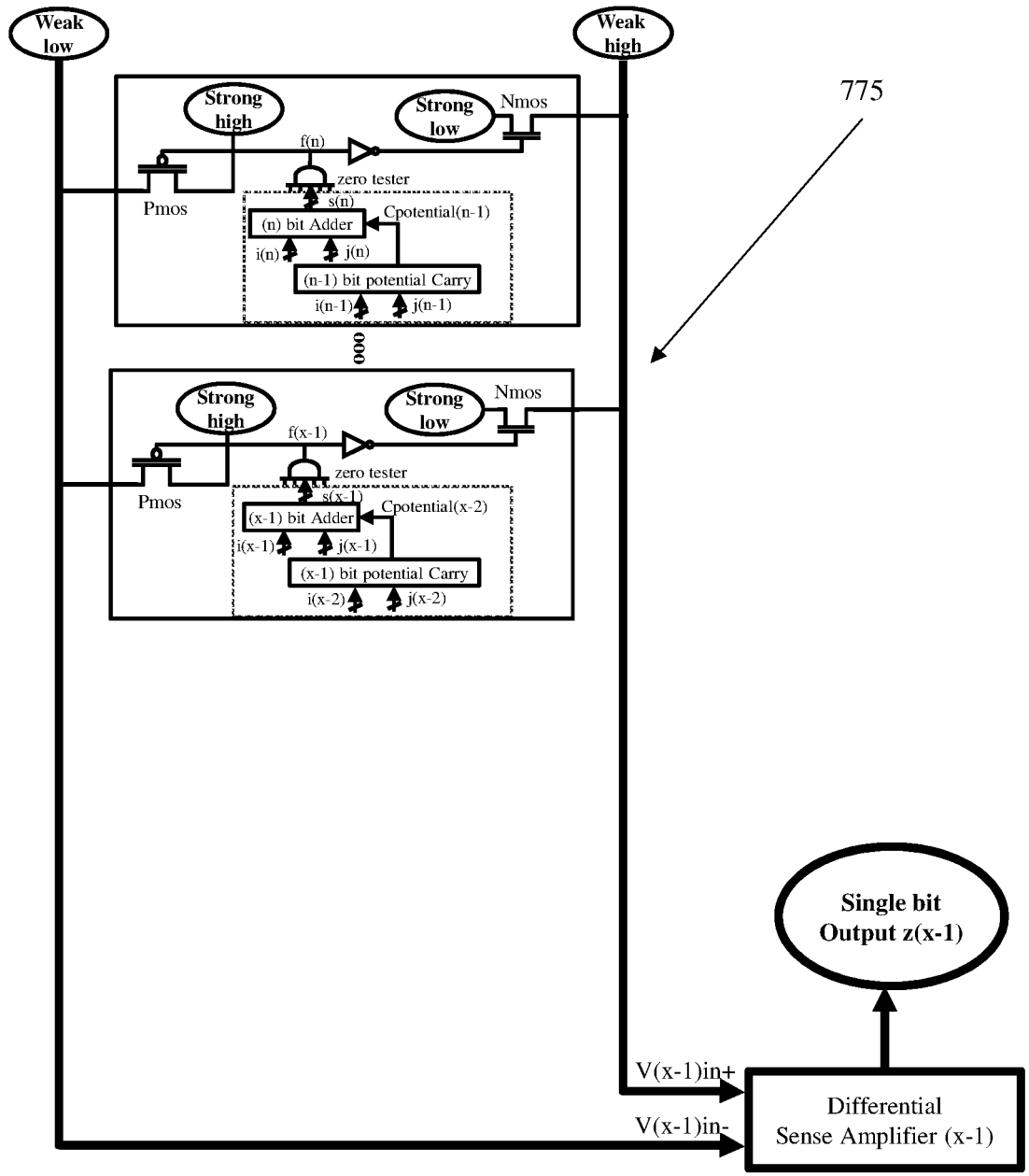

Referring now to FIG. 7F (775), by reusing/sharing the base adder circuitry+"zero tester"s+"inverter"s (shown by dotted line box in FIGS. 7D, and 7F), Circuitry z(x−1) can be implemented with a few extra Pmos/Nmos pairs and "Differential Sense Amplifiers" efficiently. The signals z(1) and z(x−1) are defined & implemented in FIGS. 7E and 7F respectively, and, all signals z(1), z(2), z(n) can be implemented in the same fashion.

Figure 7G:
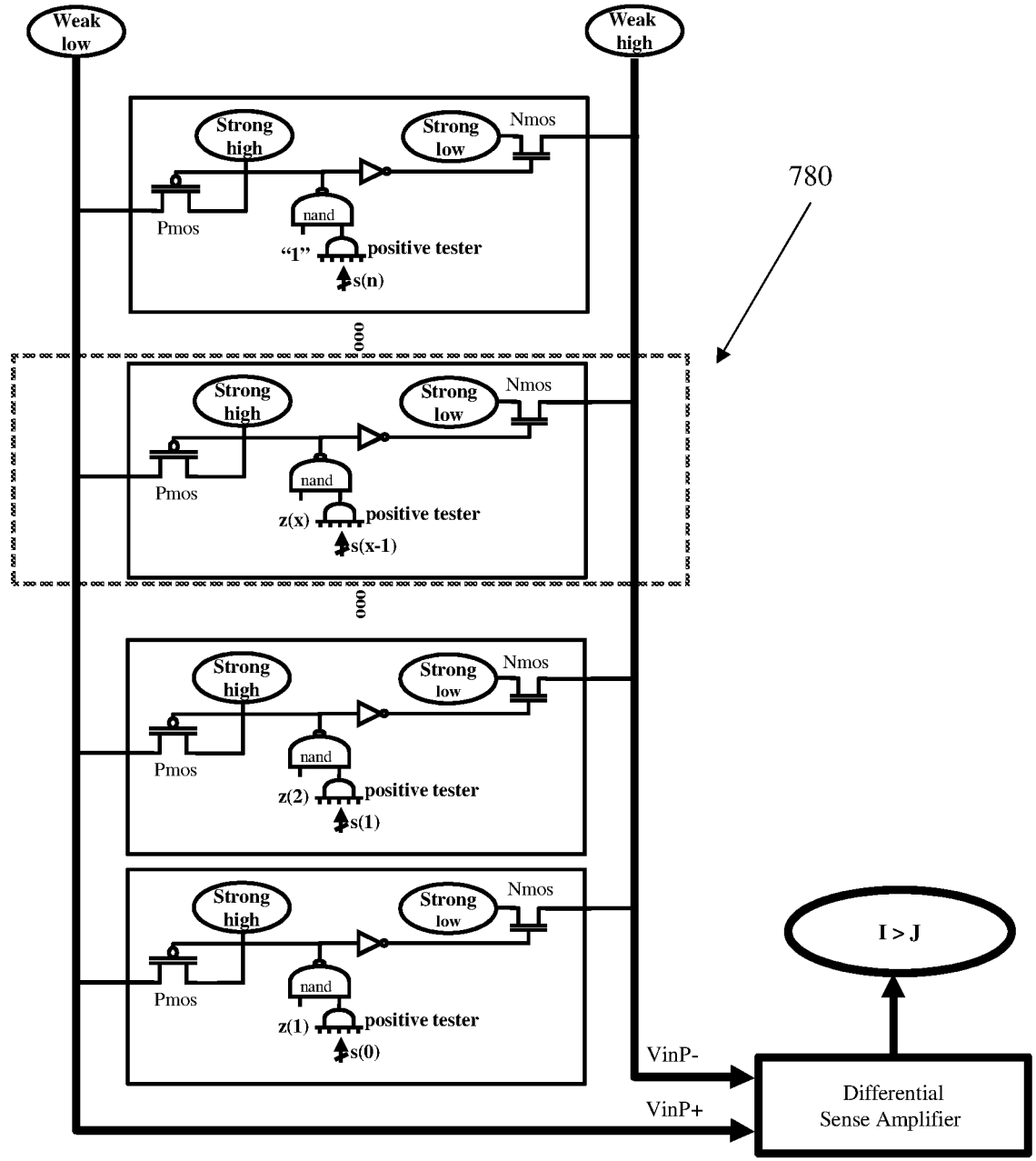
Figure 7H:
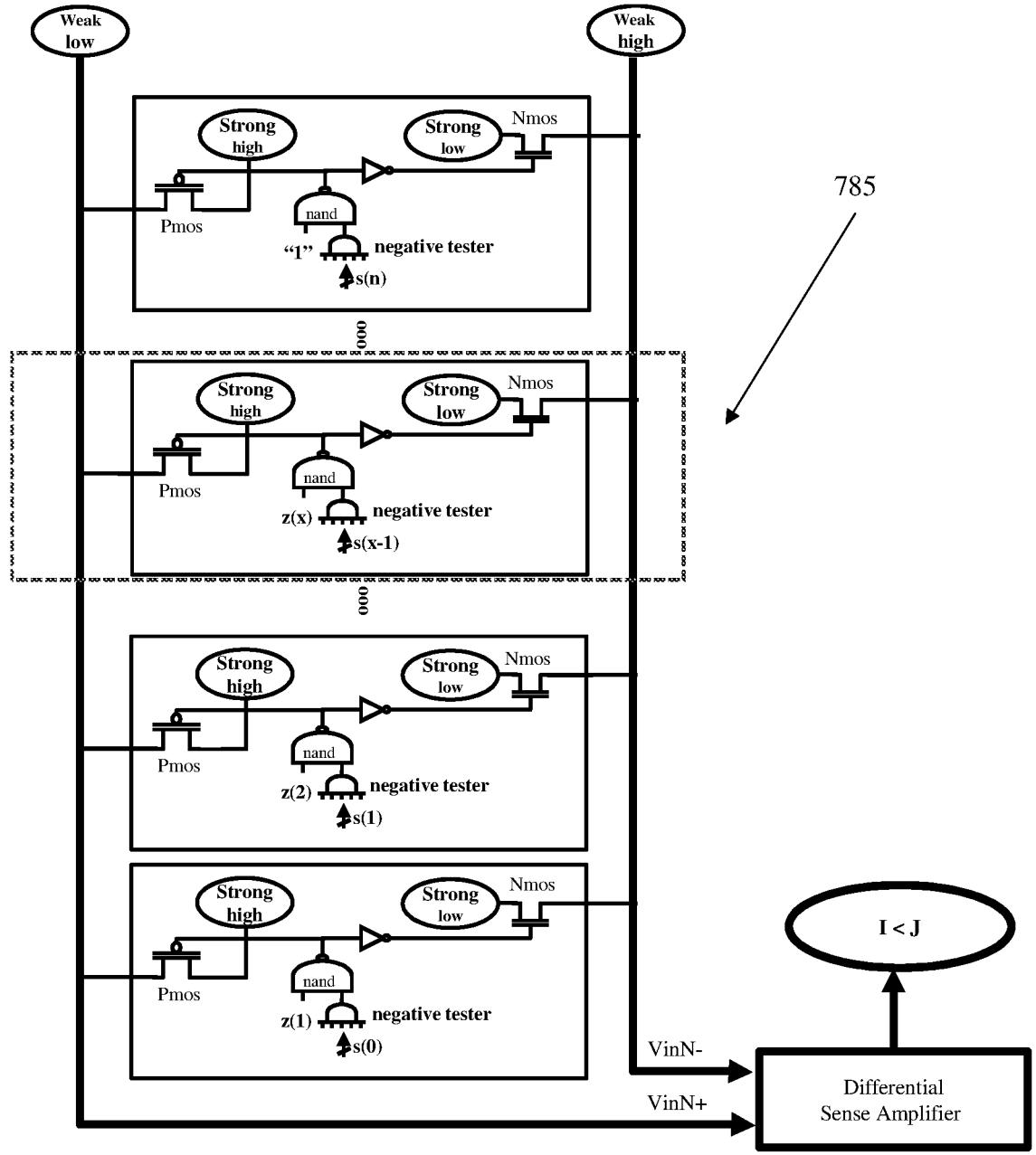

Referring now to FIGS. 7G (780) and 7H (785), with z(1), z(2), z(n) defined and implemented in FIG. 7E and FIG. 7F, the genetic magnitude comparator circuit can be simply implemented with almost constant timing cost as shown in FIGS. 7G and 7H.

If (I !=J), assume bit s(x−1) (the dot boxed in FIG. 7G and FIG. 7H) is the most significant bit with none-zero value for S=sum(I, −J).

For any bit y>(x−1), both positive and negative tester will have output as "0" for s(y), then NAND block "nand(z(y+1), s(y))" will have output as "1", and the corresponding Pmos/Nmos will be shut off.

For any bit y<(x−1), z(y+1) will be "0"; then NAND block "nand(z(y+1), s(y))" will have output as "1", and thus, the corresponding Pmos/Nmos will be shut off.

For bit (x−1), z(x) will be "1", if s(x−1) is positive, Nmos/Pmos in FIG. 7G connecting to "VinP−" and "VinP+" will be in "On" state; "VinP−" and "VinP+" will be pulled down and up to "Strong low" and "Strong high" respectively. "I>J" will be "1" (true). In parallel, Nmos/Pmos in FIG. 7H connecting to "VinN−" and "VinN+" will in "Off" state, "VinN−" and "VinN+" will stay as "Weak High" and "Weak Low" respectively. And thus, "I<J" will be "0" (false). Similar situation when s(x−1) is negative.

If (I=J), both outputs "I>J" and "I<J" will be "false".

The comparator circuitry described in FIGS. 7D, 7E, 7F, 7G, and 7H are mainly designed for RTcode with various choices of base. But they can also be applied to other number coding systems.

It is to be understood that although this disclosure includes a detailed description on a code method of Redundancy-Tolerated symmetric binary Coding (RTC) for massive parallel ALU circuitry design in GPU, TPU, NPU, AI infer chip, CPU, FPGA, ASICs, and other computing devices on on-premise hardware and/or software computing environment or cloud computing environment, implementation of the teachings recited herein are not limited to a on-premise hardware and/or software computing environment or cloud computing environment. Rather, embodiments of the present invention are capable of being implemented in conjunction with any other types of computing environments with now known or later developed instruction set architectures (such as x86, ARM, RISC-\T any kind of extended versions, or new instruction sets) in any storage types (registers/L1, L2, L3 cache, SRAM, DRAM ape disk, SSD, flash drive, and no limited to).

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8A:
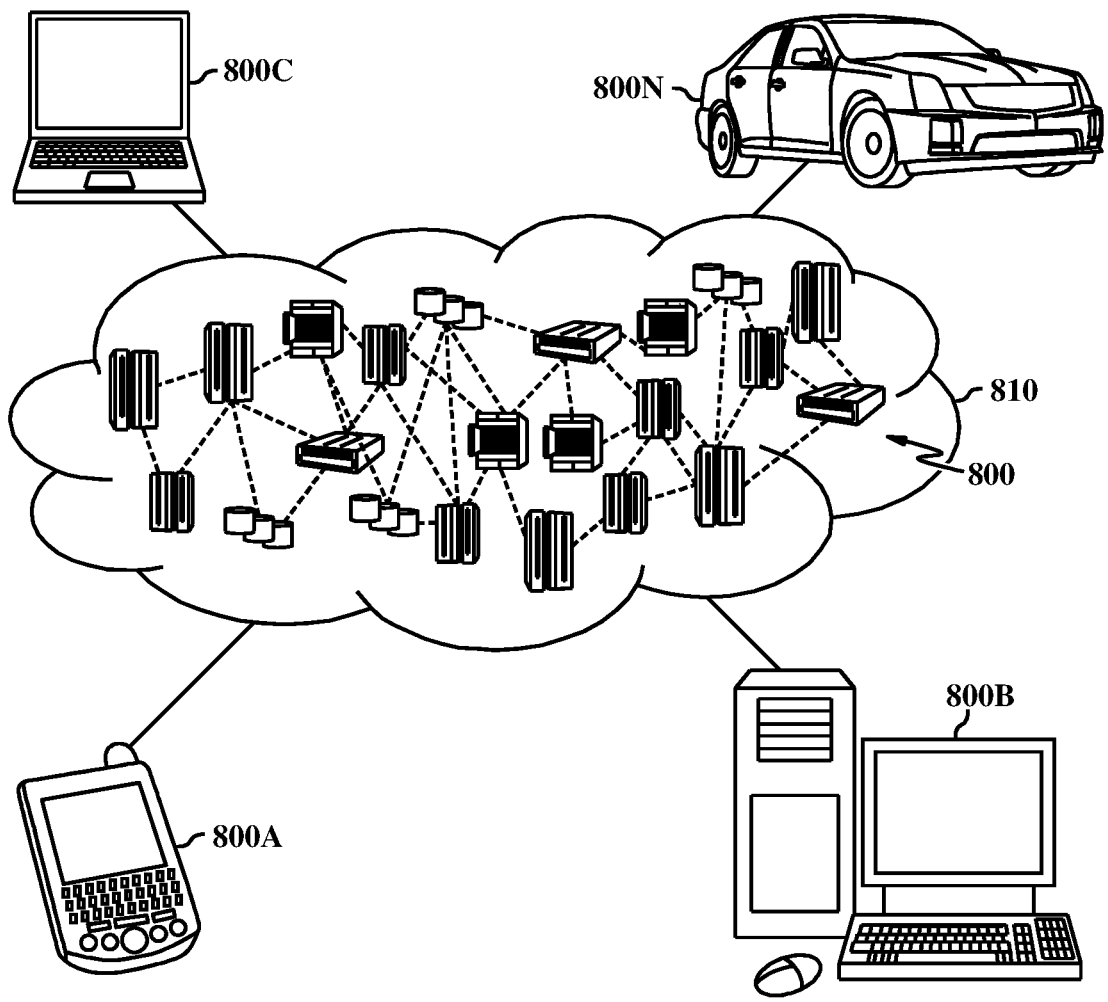
FIG. 8A illustrates a cloud computing environment, in accordance with embodiments of the present disclosure.

Referring now to FIG. 8A, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A, desktop computer 800B, laptop computer 800C, and/or automobile computer system 800N may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8A are intended to be illustrative only and that computing nodes 800 and cloud computing 800 and cloud computing environment 810 can communicate with any type of computerized device over any type of network and/or network addressable connection (e.g., using a web browser).

Figure 8B:
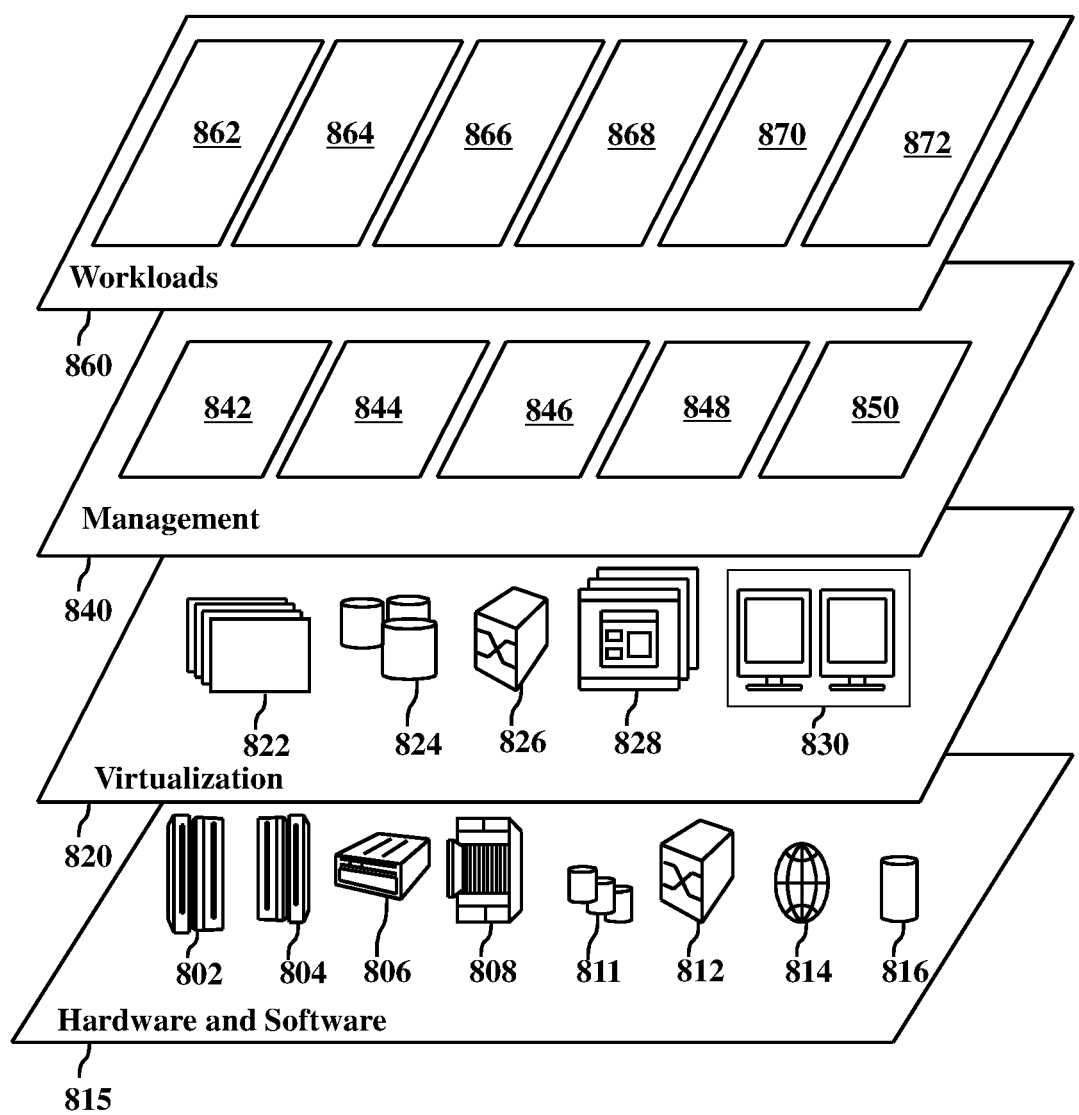
FIG. 8B illustrates abstraction model layers, in accordance with embodiments of the present disclosure.

Referring now to FIG. 8B, a set of functional abstraction layers provided by cloud computing environment 810 (FIG. 8A) is shown. It should be understood in advance that the components, layers, and functions shown in FIG. 8B are intended to be illustrative only and embodiments of the disclosure are not limited thereto. As depicted below, the following layers and corresponding functions are provided.

Hardware and software layer 815 include hardware and software components. Examples of hardware components include: mainframes 802; RISC (Reduced Instruction Set Computer) architecture based servers 804; servers 806; blade servers 808; storage devices 811; and networks and networking components 812. In some embodiments, software components include network application server software 814 and database software 816.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 890 may provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment may be utilized. Examples of workloads and functions which may be provided from this layer include: mapping and navigation 862; software development and lifecycle management 864; virtual classroom education delivery 866; data analytics processing 868; transaction processing 870; and Redundancy-Tolerated symmetric binary Coding (RTC) 872.

Figure 9:
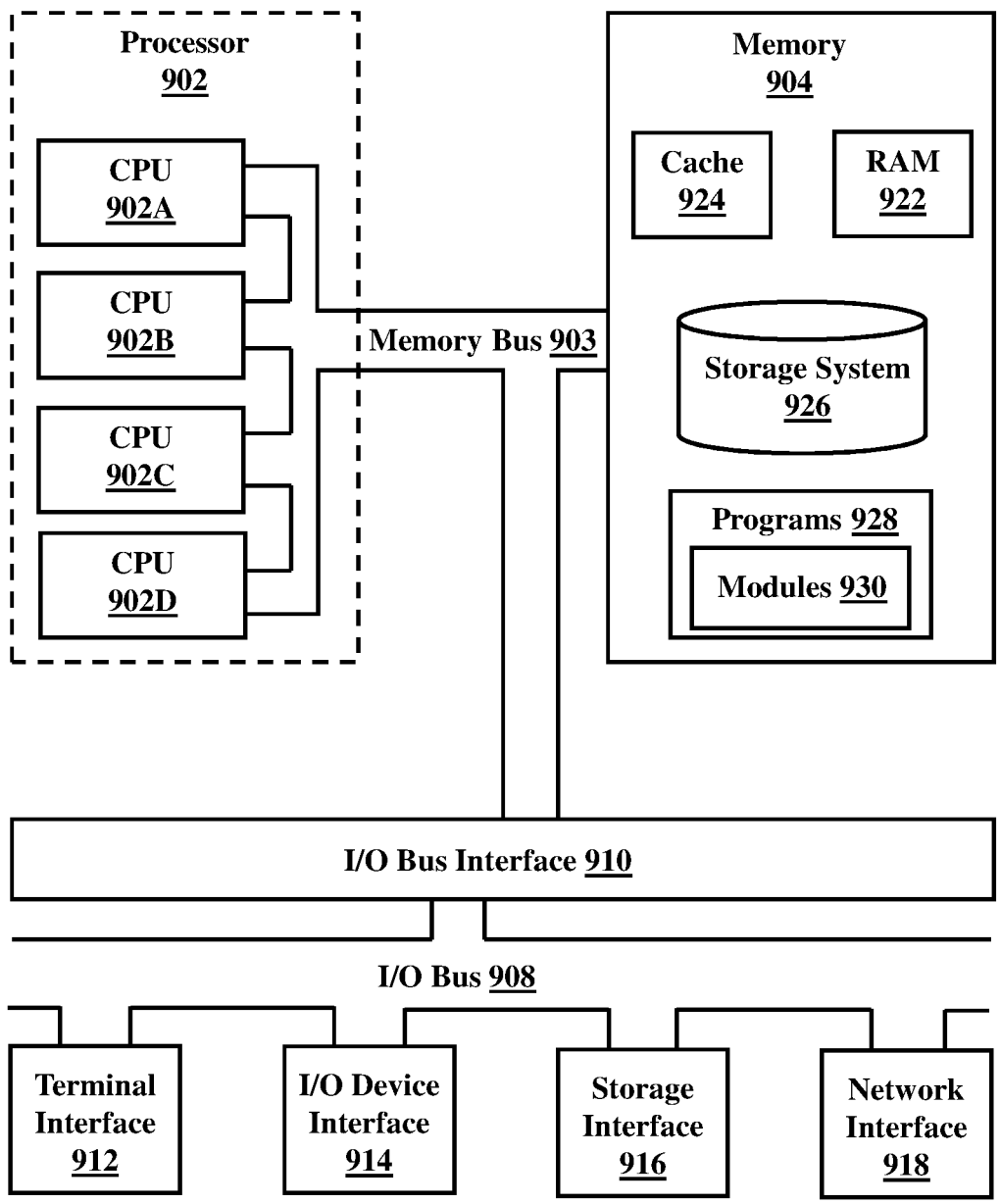
FIG. 9 illustrates a high-level block diagram of an example computer system that may be used in implementing one or more of the methods, tools, and modules, and any related functions, described herein, in accordance with embodiments of the present disclosure.

FIG. 9, illustrated is a high-level block diagram of an example computer system 901 that may be used in implementing one or more of the methods, tools, and modules, and any related functions, described herein (e.g., using one or more processor circuits or computer processors of the computer), in accordance with embodiments of the present invention. In some embodiments, the major components of the computer system 901 may comprise one or more Processor 902, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable central processing units (CPUs) 902A, 902B, 902C, and 902D, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smartphone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for encoding numerical data for parallel computation comprising arithmetic operations that eliminate sequential carry propagation, the method comprising:
   A. transforming a first binary-encoded numerical value into a first plurality of digits representing said value in a non-binary, redundant numerical format, wherein each digit in the first plurality of digits is selected from a redundant digit set comprising at least three integer values, including at least one negative integer value and at least two positive integer values;
   B. transforming a second binary-encoded numerical value into a second plurality of digits representing said value in a non-binary, redundant numerical format, wherein each digit in the second plurality of digits is selected from the redundant digit set;
   C. generating an intermediate sum by performing digit-wise addition of the first plurality of digits to the second plurality of digits without propagating carry values between digit positions;
   D. independently and simultaneously determining a local carry-out value for every digit position in the intermediate sum, wherein the determination for each respective digit position is made without dependency on the determination of the carry-out value for any less significant digit position, and is based on applying a predetermined rule set to only the value of the intermediate sum at the respective digit position, wherein the predetermined rule set comprises:
      i. generating a carry-out value of +1 if the value of the intermediate sum at the digit position is greater than or equal to a maximum value of the redundant digit set;
      ii. generating a carry-out value of −1 if the value of the intermediate sum at the digit position is less than or equal to a minimum value of the redundant digit set; and
      iii. generating a carry-out value of 0 otherwise; and
   E. producing a final sum by applying the local carry-out value from each digit position to an adjacent higher digit position.

2. The method of claim 1, wherein the redundant digit set consists of the integer values −1, 0, 1, and 2, whereby the maximum value is 2 and the minimum value is −1.

3. The method of claim 1, wherein the steps of independently determining the local carry-out value for each digit position are performed simultaneously by a plurality of logic circuits within a single clock cycle.

4. The method of claim 1, wherein the first and second numerical values are fixed-point numbers.

5. The method of claim 1, wherein the method is performed within an arithmetic logic unit (ALU) of a processor selected from the group consisting of: a graphics processing unit (GPU), a tensor processing unit (TPU), a neural processing unit (NPU), an artificial intelligence inference chip, and a central processing unit (CPU).

6. The method of claim 1, wherein applying the local carry-out value comprises adding the local carry-out value from a lower digit position to the intermediate sum of the adjacent higher digit position to form an updated digit value, and then applying the predetermined rule set to the updated digit value.

7. The method of claim 1, further comprising transforming the final sum from the redundant numerical format into a standard binary representation.

8. A computing system for performing high-speed parallel arithmetic, the system comprising: a memory storing instructions and data; at least one processor operatively coupled to the memory, the at least one processor comprising:
   A. an encoder circuit configured to transform a standard binary number into a sequence of digits encoded in a redundant format defined by a digit set comprising at least one negative integer, zero, and at least two positive integers;
   B. a parallel arithmetic logic unit (ALU) circuit operatively coupled to the encoder circuit, the parallel ALU circuit comprising a plurality of identical logic cells, each corresponding to a single digit position and configured to:
      i. receive a digit from the sequence of digits, ii. generating an intermediate sum digit for its position; and
iii. independently determine a local carry-out value by applying a static rule set to the intermediate sum digit; and
C. a carry resolution network configured to propagate the local carry-out values to adjacent digit positions.

9. The system of claim 8, wherein the static rule set causes each logic cell to:
A. output a carry-out value of +1 if the intermediate sum digit is greater than or equal to 2;
B. output a carry-out value of −1 if the intermediate sum digit is less than or equal to −1; and
C. output a carry-out value of 0 otherwise.

10. The system of claim 8, wherein the plurality of identical logic cells are configured to determine their respective local carry-out values simultaneously and in parallel within a single clock cycle.

11. The system of claim 8, wherein each of the plurality of identical logic cells comprises a combinatorial logic circuit constructed from gates selected from the group consisting of: AND gates, OR gates, XOR gates, and multiplexers (MUXes).

12. The system of claim 8, wherein the system is integrated into a semiconductor die as part of a processor core.

13. The method of claim 8, wherein the first numerical value is a partial sum from a multiply accumulate (MAC) operation in a neural network inference calculation.

14. The system of claim 8, wherein the system is part of a tensor core within a graphics processing unit (GPU) and is configured to accelerate low-precision matrix multiplication.

15. An apparatus for redundant-tolerated arithmetic computation comprising:
A. means for encoding a first fixed-point number into a first sequence of digits representable by a digit set comprising {−1, 0, 1, 2};
B. means for generating an intermediate sum by adding the first sequence of digits to a second sequence of digits representing a second fixed-point number;
C. means for determining a set of carry-out values, in parallel and without sequential carry propagation, by evaluating each digit of the intermediate sum against a rule set, wherein the rule set generates a carry-out of +1 for a digit value >=2, a carry-out of −1 for a digit value <=−1, and a carry-out of 0 for a digit value of 0 or 1; and
D. means for resolving the intermediate sum into a final non-redundant representation based on the set of carry-out values.

16. The apparatus of claim 15, wherein the means for determining a set of carry-out values comprises a plurality of identical logic cells, each logic cell corresponding to a single digit position and having the intermediate sum digit value as its input.

17. The apparatus of claim 16, wherein each logic cell comprises a first circuit path to detect if the digit value is greater than or equal to 2 and a second circuit path to detect if the digit value is less than or equal to −1.

18. A computer program product for designing an arithmetic logic unit (ALU), the computer program product comprising a non-transitory computer-readable storage medium having program instructions embodied therewith, the program instructions executable by a processor to cause the processor to perform a method comprising:
A. generating a register-transfer level (RTL) description of an arithmetic circuit, the arithmetic circuit comprising:
1. a digit-wise addition module configured to output an intermediate sum of two operands encoded in a redundant digit set;
2. a plurality of carry generation cells, each cell corresponding to a digit position of the intermediate sum and configured to output a local carry-out value based on applying a predetermined rule set to the value of the intermediate sum at its corresponding digit position, wherein the plurality of carry generation cells are configured to operate in parallel, and wherein the predetermined rule set comprises:
i. generating a carry-out value of +1 if the value of the intermediate sum at the digit position is greater than or equal to a maximum value of the redundant digit set;
ii. generating a carry-out value of −1 if the value of the intermediate sum at the digit position is less than or equal to a minimum value of the redundant digit set; and
iii. generating a carry-out value of 0 otherwise; and
3. a carry application module configured to generate a final sum by applying the local carry-out value from each cell to an adjacent higher digit position; and
B. outputting the RTL description for use in fabricating an integrated circuit.

19. The computer program product of claim 18, wherein the method further comprises simulating the timing of the arithmetic circuit, wherein a critical path of the circuit is limited to a single carry generation cell and the carry application module.

* * * * *